(12) United States Patent
Runge et al.

(10) Patent No.: US 9,920,783 B2
(45) Date of Patent: Mar. 20, 2018

(54) ARTICLE SUPPORT USING PEEL RELEASE ADHESIVES

(71) Applicant: 3M INNOVATIVE PROPERTIES COMPANY, St. Paul, MN (US)

(72) Inventors: Michael B. Runge, Pine Island, MN (US); Margaret M. Sheridan, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/036,163

(22) PCT Filed: Jun. 4, 2015

(86) PCT No.: PCT/US2015/034104
§ 371 (c)(1),
(2) Date: May 12, 2016

(87) PCT Pub. No.: WO2015/195344
PCT Pub. Date: Dec. 23, 2015

(65) Prior Publication Data
US 2017/0089377 A1    Mar. 30, 2017

Related U.S. Application Data

(60) Provisional application No. 62/013,273, filed on Jun. 17, 2014.

(51) Int. Cl.
*A47G 1/17* (2006.01)
*A47G 29/00* (2006.01)
(Continued)

(52) U.S. Cl.
CPC ............. *F16B 11/006* (2013.01); *A47G 1/17* (2013.01); *A47G 1/175* (2013.01); *A47G 1/20* (2013.01);
(Continued)

(58) Field of Classification Search
CPC ................... A47G 1/17; A47G 1/175
(Continued)

(56) References Cited

U.S. PATENT DOCUMENTS 2,987,420 A    6/1961  Bemmels et al.
4,756,498 A *  7/1988  Frye ..................... F16B 47/003
                                                         248/205.3
(Continued)

FOREIGN PATENT DOCUMENTS

CN       2518864      10/2002
JP       2002-209714   7/2002
(Continued)

OTHER PUBLICATIONS

PCT International Search Report from PCT/US2015/034104 dated Sep. 1, 2015, 3 pages.

*Primary Examiner* — Terrell L McKinnon
*Assistant Examiner* — Michael McDuffie
(74) *Attorney, Agent, or Firm* — Kevin Weber (57) ABSTRACT

An adhesive mounting article includes a flexible adhesive tape structure having a first major surface and a second major surface opposite to the first major surface. The flexible adhesive tape structure includes a peelable adhesive layer disposed on the first major surface and a first separable connecting member disposed on the second major surface. The peelable adhesive layer is capable of adhering to a mounting surface and thereafter being manually removable from the mounting surface by peeling. A rigid faceplate structure includes a rigid faceplate having a first major surface and a second major surface opposite to the first major surface, and a second separable connecting member disposed on the first major surface of the rigid faceplate. The first and second separable connecting members engage with each other to form a separable connection to connect the (Continued)

flexible adhesive tape structure and the rigid faceplate structure.

20 Claims, 2 Drawing Sheets

(51) Int. Cl.
   *F16B 47/00* (2006.01)
   *F16B 11/00* (2006.01)
   *A47G 1/20* (2006.01)
   *B29C 65/48* (2006.01)
   *F16B 1/00* (2006.01)
   *F16B 45/00* (2006.01)
   *F16M 13/02* (2006.01)
   *B29L 31/00* (2006.01)

(52) U.S. Cl.
   CPC ............... *B29C 65/48* (2013.01); *F16B 1/00* (2013.01); *F16B 45/00* (2013.01); *F16M 13/022* (2013.01); *A47G 2200/106* (2013.01); *B29L 2031/727* (2013.01); *B29L 2031/738* (2013.01); *F16B 2001/0028* (2013.01); *F16B 2001/0035* (2013.01)

(58) Field of Classification Search
   USPC ......... 248/683, 690, 692, 467, 205.3, 205.4, 248/304, 339, 205.2
   See application file for complete search history.

(56) References Cited

U.S. PATENT DOCUMENTS

| | | | |
|---|---|---|---|
| 4,923,159 A | 5/1990 | Wang et al. | |
| 5,121,896 A * | 6/1992 | Frye | F16B 47/003 248/205.3 |
| 5,507,464 A * | 4/1996 | Hamerski | A47G 1/175 248/205.3 |
| 5,518,214 A * | 5/1996 | Spencer | F21V 17/108 248/205.2 |
| 5,593,120 A | 1/1997 | Hamerski | |
| 5,989,708 A * | 11/1999 | Kreckel | A47G 1/175 248/205.3 |
| 6,001,471 A * | 12/1999 | Bries | A47G 1/175 248/205.3 |
| 6,004,642 A * | 12/1999 | Langford | C09J 7/02 248/205.3 |
| 6,082,686 A | 7/2000 | Schumann | |
| 6,187,404 B1 * | 2/2001 | Schumann | A47G 1/175 248/205.3 |
| 6,287,655 B1 | 9/2001 | Nichols, Jr. | |
| 6,352,229 B1 * | 3/2002 | Adams | A47G 1/17 24/67 R |
| 6,565,969 B1 | 5/2003 | Lamon et al. | |
| 6,641,096 B2 * | 11/2003 | Johansson | B65D 63/1009 248/205.3 |
| 6,692,807 B2 * | 2/2004 | Bries | C09J 7/02 24/306 |
| 7,178,770 B2 * | 2/2007 | Ryu | A47G 1/175 248/205.3 |
| 7,276,272 B2 * | 10/2007 | Mizuno | A47G 1/175 248/205.3 |
| 8,430,371 B2 * | 4/2013 | Boelstler | F16M 13/022 248/205.2 |
| 8,708,305 B2 * | 4/2014 | McGreevy | A47G 1/175 248/205.3 |
| 2007/0257165 A1 | 11/2007 | Newbould et al. | |
| 2011/0098376 A1 | 4/2011 | Sheerin et al. | |
| 2011/0159234 A1 | 6/2011 | Pai | |
| 2012/0153102 A1 * | 6/2012 | Thompson | A47G 1/175 248/205.3 |
| 2012/0233932 A1 * | 9/2012 | Kharchenko | A47K 10/10 52/34 |
| 2014/0306076 A1 * | 10/2014 | Friesch | A47G 1/17 248/205.3 |
| 2015/0201764 A1 * | 7/2015 | Sato | A47G 1/175 248/205.4 |

FOREIGN PATENT DOCUMENTS

| | | |
|---|---|---|
| WO | WO 94/21157 | 9/1994 |
| WO | WO 99/31193 | 6/1999 |

* cited by examiner

ARTICLE SUPPORT USING PEEL RELEASE ADHESIVES

TECHNICAL FIELD

The present disclosure relates to article supports or mounting articles using peel release adhesives.

BACKGROUND

Peelable adhesive products are available that can adhere to a surface, for example, a wall surface, and thereafter removed by peeling. In one commercially available hook, a semi-rigid plastic backing and a rigid hook are integrated as a one-piece article support. The rigid hook is permanently attached to a central surface of the semi-rigid plastic backing and the opposite surface of the semi-rigid plastic backing can be adhered to a wall surface, and thereafter removed by peeling. However, the shear performance of the available peelable adhesive products needs to be improved.

SUMMARY

Briefly, in one aspect, the present disclosure describes mounting articles for mounting an object to a mounting surface or a surface of a substrate, for example, a vertical wall or a cabinet surface. The mounting articles can include a flexible adhesive tape and a rigid plate connected by a separable connector. The flexible adhesive tape can adhere to the mounting surface via, for example, a peelable adhesive disposed on a rear surface of the flexible adhesive tape, and thereafter be manually removed from the mounting surface by peeling. The rigid plate can cover the flexible adhesive tape from front and/or side views when the mounting articles are in use. This can prevent the flexible adhesive tape from being manually peeled from the mounting surface when the rigid plate is connected, via the separable connector, to the flexible adhesive tape.

Some embodiments described herein provide mounting articles having a two-piece structure, i.e., a flexible adhesive tape and a rigid plate that are detachably connected. This allows the flexible adhesive tape to be developed independently from the rigid plate. In some embodiment, properties of the flexible adhesive tape including, for example, adhesive properties, release properties, etc., can be optimized independently from the rigid plate. In some embodiments, the flexible adhesive tape or adhesive(s) on the flexible adhesive tape can be replaced after use, and the rigid plate can be useable. This allows an inter-changeability of flexible adhesive tapes for different environments if desired.

The embodiments described herein provide mounting articles that can produce superior weight claims, have smaller footprints, and more consistent performance on various household surfaces such as, for example, painted drywall.

In one embodiment, an adhesive mounting article is provided. The adhesive mounting article includes a flexible adhesive tape structure having a first major surface and a second major surface opposite to the first major surface. The flexible adhesive tape structure includes a peelable adhesive layer disposed on the first major surface and a first separable connecting member disposed on the second major surface. The peelable adhesive layer is capable of adhering to a mounting surface and thereafter manually removable from the mounting surface by peeling. A rigid faceplate structure includes a rigid faceplate having a first major surface and a second major surface opposite to the first major surface, and a second separable connecting member disposed on the first major surface of the rigid faceplate. The first and second separable connecting members can engage with each other to form a separable connection.

In another embodiment, a mounting article includes a flexible adhesive tape including a flexible backing layer and a peelable adhesive coated on a rear surface of the flexible backing layer. The flexible adhesive tape is capable of adhering to, via the peelable adhesive, a mounting surface and thereafter being manually removable from the mounting surface by peeling. A rigid plate includes a mounting member permanently attached to a front surface of the rigid plate. A separable connector to provide a separable connection between the flexible adhesive tape and the rigid plate, the separable connector including a first connector member disposed on a front surface of the flexible backing layer and a second connector member disposed on a rear surface of the rigid plate, the first and second connector components being engagable/disengagable with each other to connect/disconnect the rigid plate and/from the flexible adhesive tape.

In another embodiment, an article support adapted for adhering to a substrate includes a flexible adhesive tape having a first major surface and a second major surface opposite to the first major surface. The first major surface includes a peel release adhesive capable of adhering to the substrate. A rigid plate has a first major surface and a second major surface opposite to the first major surface. The first major surface includes a mounting member permanently attached thereon. The second major surface of the adhesive tape and the second major surface of the rigid plate are engagable with each other to detachably connect the rigid plate and the flexible adhesive tape.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Reference throughout this specification to "one embodiment," "some embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

With reference to the Figures, like numerals are used to designate like components throughout the set of Figures. FIGS. 1 to 4 illustrate an adhesive mounting article 10. The adhesive mounting article 10 includes a flexible adhesive tape structure 12, a rigid faceplate structure 14 defining a recess 20 to receive the flexible adhesive tape structure 12, a mounting member 18 attached to the rigid faceplate structure 14, and a separable connector 16 configured to detachably connect the flexible adhesive tape structure 12 and the rigid faceplate structure 14.

In the embodiment shown in FIGS. 1-4, the flexible adhesive tape structure 12 has a rectangular shape and the rigid faceplate structure 14 has an oval shape. It is to be understood that the flexible adhesive tape structure and the rigid faceplate structure can be any suitable shapes as long as the flexible adhesive tape structure can be received by the recess of the rigid faceplate structure. In some embodiments, the rigid faceplate structure can have a shape and/or size that follow the shape/size of flexible adhesive tape structure. In one embodiment, the flexible adhesive tape structure can include a rectangular adhesive strip and the rigid faceplate structure can include a rectangular rigid plate having a recess to receive the rectangular adhesive strip.

Figure 1:
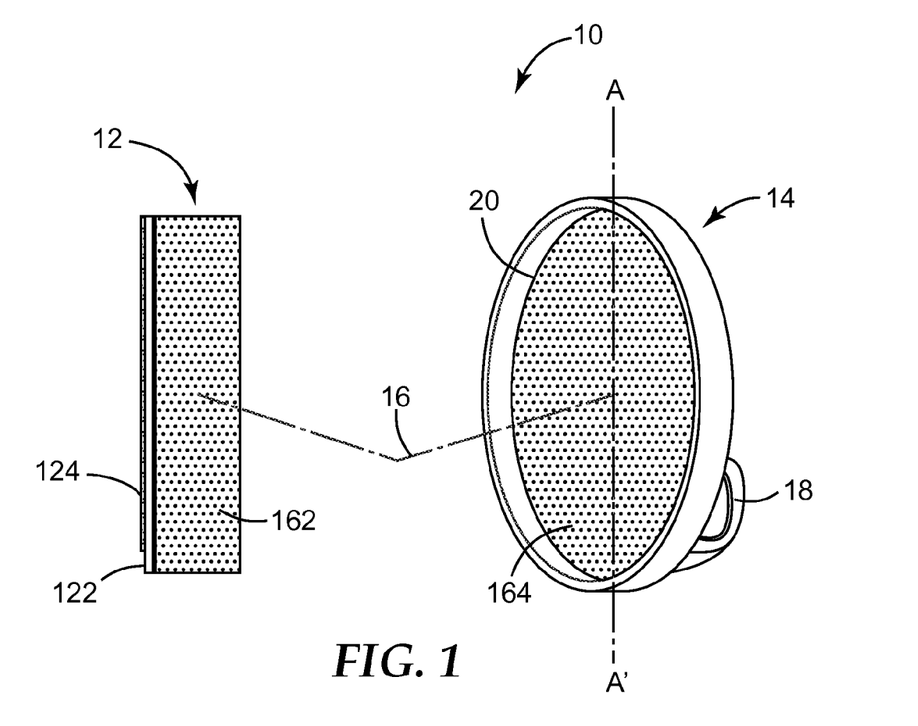
FIG. 1 is a perspective view of an adhesive mounting article including a flexible adhesive tape structure and a rigid faceplate structure to be connected, according to one embodiment.
Figure 2:
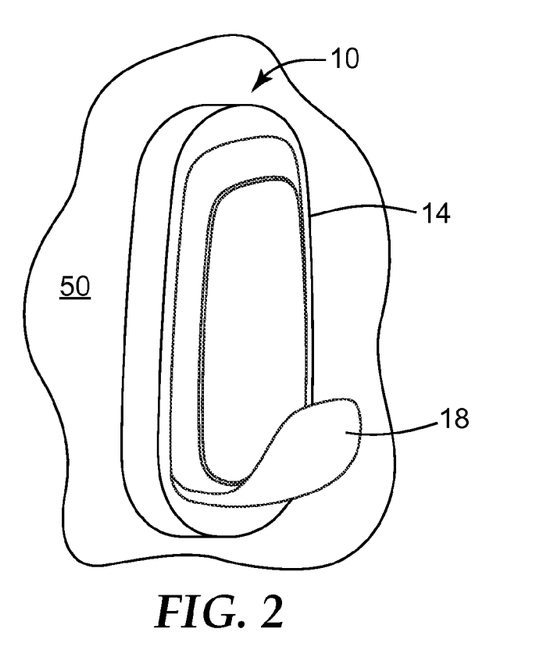
FIG. 2 is a perspective view of the adhesive mounting article of FIG. 1 adhering to a mounting surface.

As shown in FIG. 2, the adhesive mounting article 10 can adhere to a mounting surface 50, for example, a vertical wall surface, for mounting an object (not shown), for example, a picture frame. The flexible adhesive tape structure 12 (not visible in FIG. 2) is capable of adhering to the mounting surface 50 and thereafter being manually removable from the mounting surface 50 by peeling without causing damage to the mounting surface 50. When the rigid faceplate structure 14 connects to the flexible adhesive tape structure 12, the flexible adhesive tape structure 12 is received by the recess 20 of the rigid faceplate structure 14, and the rigid faceplate structure 14 covers the flexible adhesive tape structure 12 from both front and side views to hide the flexible adhesive tape structure 12. This can prevent the flexible adhesive tape structure 12 from being manually removed from the mounting surface 50 by peeling when the mounting article 10 is in use. When the rigid faceplate structure 14 is disconnected from the flexible adhesive tape structure 12, the flexible adhesive tape structure 12 is exposed and can be removed from the mounting surface 50 by peeling.

An object (not shown), for example, a picture frame, can be mounted on the mounting member 18. In the embodiment shown in FIG. 2, the mounting member 18 is a hook that is permanently attached to the rigid faceplate structure 14. It is to be understood that the mounting member can be any functional device other than a hook. In some embodiments, the rigid faceplate structure 14 and the mounting member 18 can be integrated as one-piece. In some embodiments, the mounting member 18 can be removable from the rigid faceplate structure 14.

Figure 3:
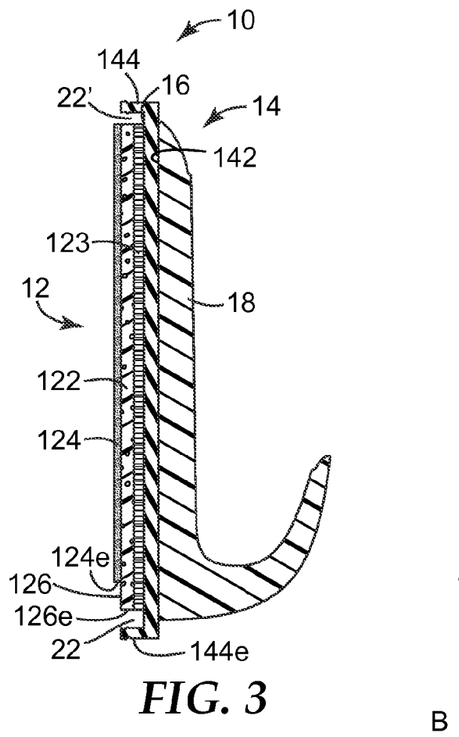
FIG. 3 is a side view in cross section of the adhesive mounting article of FIG. 1 with the flexible adhesive tape structure and the rigid faceplate structure being connected.

As illustrated best in FIG. 3, the rigid faceplate structure 14 and the flexible adhesive tape structure 12 are connected together by the separable connector 16. The flexible adhesive tape structure 12 is received by the recess 20 of the rigid faceplate structure 14. The flexible adhesive tape structure 12 may vary in overall thickness so long as it possesses sufficient integrity to be processable and provides the desired performance in respect to adhesion properties for adhering to and peelable from a mounting surface. The depth of the recess 20 can be determined to accommodate the flexible adhesive tape structure 12 by considering both the thickness of the flexible adhesive tape structure 12 and structures and materials of the rigid faceplate structure 14 that define the recess 20.

Figure 4:
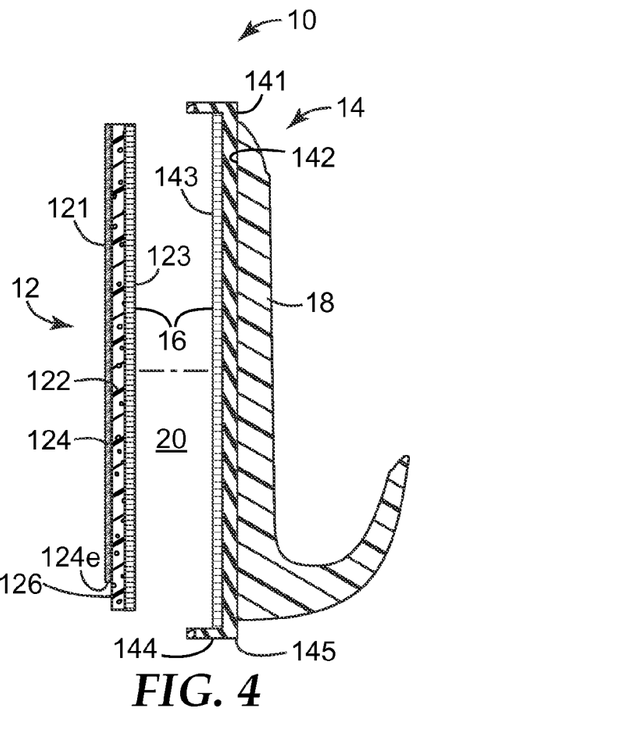
FIG. 4 is a side view in cross section of the adhesive mounting article of FIG. 1 with the flexible adhesive tape structure and the rigid faceplate structure being disconnected.

As illustrated best in FIG. 4, the flexible adhesive tape structure 12 includes a flexible backing layer 122 having a first major surface 121 and a second major surface 123 opposite to the first major surface 121, and a peelable adhesive layer 124 disposed on the first major surface 121 of the flexible backing layer 122. The thicknesses of the layers of the Figures are not to scale with respect to one another. It is to be understood that a liner (not shown) can be provided to cover and protect the external surface of the peelable adhesive layer 124.

The flexible backing layer 122 has sufficient flexibility so that a user can easily remove the flexible adhesive tape structure 12 from a mounting surface by peeling when the flexible adhesive tape structure 12 is uncovered by the rigid faceplate structure 14. In some embodiments, the flexible backing layer 122 can also provide conformability and resiliency properties which are helpful when the flexible adhesive tape structure 12 is to be adhered to a mounting surface having surface irregularities. In some embodiments, the flexible backing layer 122 can include a flexible polymeric foam layer. In some embodiments, the flexible backing layer 122 can include a flexible polymeric film. In some embodiments, the flexible backing layer 122 includes multiple layers that include one or more polymeric foam layers, and/or one or more polymeric films. In some embodiments, the flexible backing layer 122 utilized with the peelable adhesive layer 124 can be a solid adhesive backing layer.

Representative examples of materials suitable for the flexible backing layer 122 can include, for example, polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadienestyrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

In some embodiments, the flexible backing layer 122 of the flexible adhesive tape structure 12 can be a composite foam that includes a flexible polymeric foam layer, a first film laminated to a first major surface of the foam layer, and a second film laminated to a second, opposite major surface of the foam layer. Adhesive(s) can be attached to the films to form a structure of adhesive-film-foam-film-adhesive. The flexible polymeric foam layer can be chosen to optimize conformability and resiliency properties which are helpful when the flexible adhesive tape structure 12 is to be adhered to surfaces having surface irregularities. Such is the case with a typical wall surface. A flexible polymeric foam layer is commercially available under the trade designation "Command" from Minnesota Mining and Manufacturing Company ("3M") of St. Paul, Minn. In some embodiments, the flexible polymeric foam layer of the flexible backing layer 122 can include polyolefin foams which are available under the trade designations "Volextra" and "Volara" from Voltek, Division of Sekisui America Corporation, Lawrence, Mass.

The flexible adhesive tape structure 12 can be produced by any conventional method for preparing adhesive tapes. In one embodiment, the peelable adhesive layer 124 can be directly coated onto the flexible backing layer 122. In another embodiment, the peelable adhesive layer 124 can be formed as a separate layer and then later laminated to the flexible backing layer 122. In some embodiments, two or more sub-layers can be co-extruded so as to provide the flexible backing layer 122.

The peelable adhesive layer 124 of the flexible adhesive tape structure 12 can include any adhesive which can be disposed on the first major surface 121 of the flexible backing layer 122. In some embodiments, the peelable adhesive layer can include at least one of rubber, silicone, or acrylic based adhesives. In some embodiments, the peelable adhesive layer can include a non-stretch release adhesive such as, for example, a pressure-sensitive adhesive (PSA) or an epoxy adhesive. In some embodiments, the peelable adhesive layer 124 can include tackified rubber adhesives, such as natural rubber; olefins; silicones, such as silicone polyureas; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques. The adhesive of the peelable adhesive layer 124 can include any peelable adhesive, with the particular adhesion properties being dependent on the use of the flexible adhesive tape structure 12. In some embodiments, adhesion properties of the adhesive can range from 0 N/dm to 25 N/dm. In some embodiments, adhesion properties of the adhesive can range from 0.5 N/dm to 10 N/dm. In some embodiments, adhesion properties of the adhesive can range from 1 N/dm to 5 N/dm. In some embodiments, a more permanent adhesion can be provided by the peelable adhesive layer such that a mounting surface may be damaged after removing the peelable adhesive layer therefrom.

Removing the flexible adhesive tape structure 12 from the surface of a substrate or a mounting surface can be carried out by simply peeling the tape at a peel angle of, for example, 90° or higher. It is to be understood that the peel angle can be lower than 90°. Removal at the appropriate peel angle can result in leaving no substantial or appreciable adhesive residue and in preventing the surface of the substrate from being damaged.

The rigid faceplate structure 14 includes a rigid faceplate 142 having a first major surface 141 and a second major surface 143 opposite to the first major surface 141. The mounting member 18 is attached to the first major surface 141. An apron 144 is disposed around the periphery 145 of the rigid faceplate 142. The apron 144 extends from the rigid faceplate 145 and defines the recess 20 at the second major surface 143. In some embodiments, when the rigid faceplate structure 12 is connected to the flexible adhesive tape structure 12 that is adhered to a mounting surface, at least a portion of the apron 144 can be pressed against the mounting surface.

The rigid faceplate 142 of the rigid faceplate structure 14 can be made of a rigid material such as, for example, thermoplastic materials including polycarbonate (PC) or acrylonitrile butadiene styrene (ABS). The rigid faceplate 142 need not be optimized for adhesion to the mounting surface, and depending on the contemplated use other desirable properties may be selected for such as cost, surface appearance, suitability for accepting decorative plating, bending strength, ability to be readily injection molded, etc. In some embodiments, depending on the exact application, rigid polyvinyl chloride, high impact polystyrene, or nylon may be used. It is to be understood that the rigid faceplate 142 can be made of any suitable rigid material having appropriate rigidity properties that can provide reinforcement of the peelable adhesive tape structure 12 that is connected to the rigid faceplate 142.

In the embodiment shown in FIGS. 1-4, the apron 144 is made of a rigid material same as or different from that of the rigid faceplate 142. In some embodiments, the apron 144 is an extended portion of the rigid faceplate 142. That is, the periphery 145 of the rigid faceplate 142 extends in a direction perpendicular to the second major surface 143 to form the apron 144. In some embodiments, the apron 144 can include a compressible material such as, for example, a polymeric foam material. When the rigid faceplate structure 12 is connected to the flexible adhesive tape structure 12 that is adhered to a mounting surface, the compressible material can be pressed against the mounting surface and compressed.

In some embodiments, when the adhesive mounting article 10 adheres to a mounting surface, the apron 144 can be in direct contact with the mounting surface and surround the flexible adhesive tape structure 12 in 360° to completely block the side view of the flexible adhesive tape structure 12. In some embodiments, only a portion of the apron 144 is in direct contact with the mounting surface and the apron 144 can partially block the side view of the flexible adhesive tape structure 12.

Figure 5:
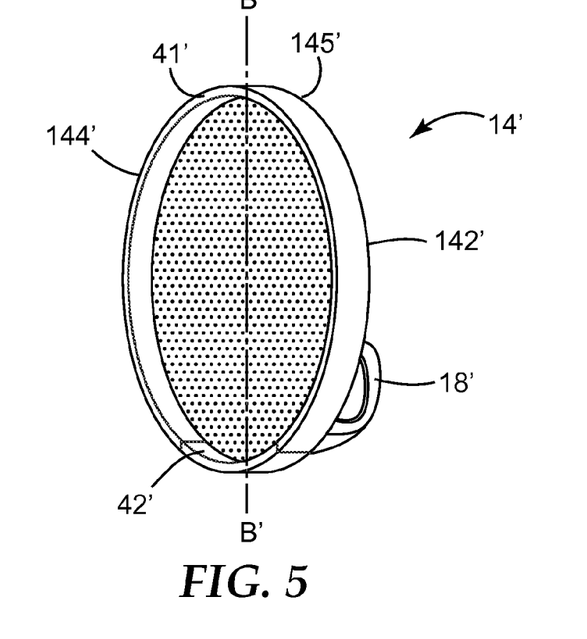
FIG. 5 is a perspective view of a rigid faceplate structure, according to another embodiment.

Illustrated in FIG. 5 is a rigid faceplate structure 14', according to another embodiment. Similar to the rigid faceplate structure 14, the rigid faceplate structure 14' includes a rigid faceplate 142' having first and second major surfaces. A mounting member (hook) 18' is attached to the first major surface. An apron 144' is disposed around the periphery 145' of the rigid faceplate 142'. The apron 144' extends from the rigid faceplate 142' and defines a recess to receive a flexible adhesive tape structure such as the flexible adhesive tape structure 12.

The apron 144' includes a first portion 41' and a second portion 42' that can include different materials. The first portion 41' is the majority portion of the apron 144' and is provided to hide the received flexible adhesive tape structure. The second portion 42' is located at a bottom portion of the rigid faceplate structure 14' and faces a direction generally parallel to a longitudinal axis BB' of the rigid faceplate structure 14'. The second portion 42' is a minority portion of the apron 144'. In some embodiments, the length of the second portion 42' can be, for example, 1/50 to 1/2, 1/20 to 1/3, or 1/10 to 1/4 of the circumference of the apron 144' around the periphery 145'. When the rigid faceplate structure 14' is connected to the flexible adhesive tape structure 12 that is adhered to a mounting surface, the second portion 42' of the apron 144' can be pressed against the mounting surface 50 and in direct contact with the mounting surface. The second portion 42' can act as a supporting member to support the rigid faceplate structure 14' when the mounting member 18' is loaded by mounting an object.

In some embodiments, the first portion 41' can be made of a compressible material such as, for example, a polymeric foam material. The second portion 42' can be made of a rigid material. In some embodiments, the second portion 42' can be an extended portion of the rigid faceplate 142'.

In some embodiments, the first portion 41' may not be provided to hide the connected flexible adhesive tape structure 12. Only the second portion 42' is provided as a supporting member to support the rigid faceplate structure 14' when the mounting member 18' is loaded with an object.

Referring back to FIGS. 1, 3 and 4, the separable connector 16 includes a first separable connecting member 162 disposed on the second major surface 123 of the flexible backing layer 122, and a second separable connecting member 164 disposed on the second major surface 143 of the rigid faceplate 142 and received by the recess 20. The first and second separable connecting members 162 and 164 are engagable with each other to form a separable connection, thereby detachably connecting the flexible adhesive tape structure 12 and the rigid faceplate structure 14. As shown in FIG. 4, the flexible adhesive tape structure 12 and the rigid faceplate structure 14 are separable so that the first separable connecting member 162 remains with the flexible adhesive tape structure 12 and the second separable connecting member 164 remains with the rigid faceplate structure 14 after separation of the separable connector 16.

The separable connector 16 can include any known or developed reusable connector for connecting the flexible adhesive tape structure 12 and the rigid faceplate structure 14. The separable connector 16 permits the reusable separation and connection of the flexible adhesive tape structure 12 and the rigid faceplate structure 14 along a general plane. In some embodiments, the separable connector 16 can include, for example, a mechanical type fastener including an interlocking system, an intermeshing system having connection without macroscopic mechanical deformation or interference, a releasable contact responsive fastener, a splittable construction, and the like.

In some embodiments, the first separable connecting member 162 can include a layer of hook material which is bonded with the flexible backing layer 122 at the second major surface 123 thereof, and the second separable connecting member 164 can include a layer of loop material which is bonded with the rigid faceplate 142 at the second major surface 143 thereof. It is contemplated that any commercially available hook and loop connector system can be utilized.

Hook and loop connector systems are but one type of mechanical interlocking connector systems which are suggested by this embodiment. By mechanical interlocking, it is meant those fasteners where at least one of the connector elements undergoes some macroscopic deformation (preferably plastic deformation) so that a mechanical interference results between plural components. Well known examples include hook and loop products commercially available under the trade designation "3M Scotchmate" industrial fastener, from Minnesota Mining and Manufacturing Company ("3M") of St. Paul, Minn.) and those hook and loop products that are commercially available under the trade designation "Velcro". Many other connector systems and fasteners are known which comprise elements extending from a generally planar layer of one material to meet with similar or dissimilar cooperating members extending from another generally planar layer. Many different modifications of the inter-engaging elements are designed based on the requisite force and manner of separation between the cooperating layers of such a separable connector system. In some embodiments, the separable connector 16 can provide, for example, a dual-lock connection, or a micro-rail connection.

In some embodiments, the separable connector 16 can include a connector system other than a mechanical connector system. The separable connector 16 can include, for example, a magnetic connector system including a first magnetic connecting member disposed on the flexible adhesive tape structure 12 and a second magnetic connecting member disposed on the rigid faceplate structure 14.

The area of connection and the type of the separable connector 16 can be selected so that the force required to separate the flexible adhesive tape structure 12 from the rigid faceplate structure 14 can be readily applied by a user. Such a force may be applied in a direction substantially perpendicular to the general plane of the connector 16. In one embodiment, a force can be applied by rotating the rigid faceplate 144 around a longitudinal axis AA' of the rigid faceplate structure 14 to separate or cleave off the first and second connecting members 162 and 164. When the apron 144 is made of a rigid material, the apron 144 can be chamfered at an outer periphery to facilitate such rotation. In another embodiment, a force can be applied to pull the rigid faceplate 144 or the mounting member 18 away from the mounting surface to disengage the first and second connecting members 162 and 164.

The separable connector 16 can provide sufficient strength along the general plane of its separation so that, depending on the specific application, the separable connector 16 will not separate based on the use of the adhesive mounting article for mounting an object on the mounting surface. The separable connector 16 can provide an internal static shear strength in a direction parallel to the general plane for supporting the mounted object. In some embodiments, the shear strength of the separable connector 16 can equal or exceed the highest shear force that the peelable adhesive layer 124 can develop with the mounting surface to which it is applied. In some embodiment, the peelable adhesive layer 124 can provide a shear force of, for example, 4-20 pounds per square inch.

In some embodiments, the aggressiveness of the peelable adhesive layer 124 can be chosen so that the separable connector 16 including the first and second separable connecting members 162 and 164 separates prior to delamination of the peelable adhesive layer 124 or to separation of the bond between the peelable adhesive layer 124 and the mounting surface 50.

As shown in FIGS. 3 and 4, the flexible backing layer 122 extends beyond an edge 124e of the peelable adhesive layer 124 to form a tab portion 126. When the flexible adhesive tape structure 12 is uncovered by the rigid faceplate structure 14, the tab portion 126 can facilitate the peeling of the peelable adhesive layer 124 from a mounting surface, e.g., the mounting surface 50. The tab portion 126 is provided as an extension of the flexible backing layer 122. That is, the flexible backing layer 122 extends farther than the peelable adhesive layer 124. The tab portion 126 is non-adhesive to the mounting surface. After the rigid faceplate structure 14 is disconnected from the flexible adhesive tape structure 12 as shown in FIG. 4, by application of a peeling force to the tab portion 126, the peelable adhesive layer 124 along with other components of the flexible adhesive tape structure 12 can be removed from the mounting surface. It is to be understood that the tab portion 126 can be located at the top, bottom, or side of the flexible backing layer 122 to facilitate the peeling of the peelable adhesive layer 124 from the mounting surface.

As illustrated in FIG. 3, when the flexible adhesive tape structure 12 is received in the recess 20 of the rigid face plate structure 14, a gap 22 is formed between a bottom edge 122e of the flexible backing layer 122 and a bottom portion 144e of the apron 144. When the adhesive mounting article 10 is in use, the bottom portion 144e of the apron 144 can be pressed against the mounting surface 50 and act as a supporting member for the adhesive mounting article 10. The bottom portion 144e can be, for example, the second portion 42' shown in FIG. 5. The gap 22 separates the flexible adhesive tape structure 12 from the bottom portion 144e of the apron 144. This can prevent undesired premature peeling of the peelable adhesive layer 124 adjacent the bottom portion 144e from the mounting surface 50 when the bottom portion 144e of the apron 144 is pressed against the mounting surface. In some embodiments, the gap 22 can have a dimension being 1/50 to 1/4, 1/30 to 1/6, or 1/20 to 1/10 of the dimension of the flexible backing layer 122 along the longitudinal axis AA'. Optionally, a gap 22' can be formed between the flexible backing layer 122 and the apron 144 at an upper portion of the recess 20. In some embodiments, it will be appreciated that side edges of the flexible backing layer 122 can be in direct contact with inner surfaces of the apron 144.

Aspects

Aspect 1. An adhesive mounting article, comprising:
a flexible adhesive tape structure having a first major surface and a second major surface opposite to the first major surface, the flexible adhesive tape structure including a peelable adhesive layer disposed on the first major surface and a first separable connecting member disposed on the second major surface, the peelable adhesive layer being capable of adhering to a mounting surface and thereafter being manually removable from the mounting surface by peeling; and a rigid faceplate structure including a rigid faceplate having a first major surface and a second major surface opposite to the first major surface, and a second separable connecting member disposed on the first major surface of the rigid faceplate, the first and second separable connecting members being configured to engage with each other to form a separable connection to connect the flexible adhesive tape structure and the rigid faceplate structure.

Aspect 2. The adhesive mounting article of aspect 1, wherein the rigid faceplate structure covers the flexible adhesive tape structure to prevent the flexible adhesive tape structure from being manually removed from the mounting surface by peeling when the rigid faceplate structure is connected, via the separable connection, to the flexible adhesive tape structure.

Aspect 3. The adhesive mounting article of aspects 1 or 2, wherein the flexible adhesive tape structure further includes a flexible backing layer, and the peelable adhesive layer and the first separable connecting member are disposed on opposite surfaces of the flexible backing layer.

Aspect 4. The adhesive mounting article of aspect 3, wherein the flexible backing layer extends longitudinally beyond an edge of the peelable adhesive layer to form a tab portion.

Aspect 5. The adhesive mounting article of aspects 3 or 4, wherein the flexible backing layer includes a flexible polymeric foam layer.

Aspect 6. The adhesive mounting article of any of aspects 1-5, wherein the rigid faceplate defines a recess on the first major surface thereof, the second separable connecting member is disposed within the recess, and when the first and second separable connecting members are engaged with each other to form the separable connection, the flexible adhesive tape structure is received by the recess.

Aspect 7. The adhesive mounting article of any of aspects 1-6, wherein the rigid faceplate structure further includes an apron disposed around a periphery of the rigid faceplate to form a recess, and the apron is positioned such that when the rigid faceplate structure is connected, via the separable connection, to the flexible adhesive tape structure at least a portion of the apron is pressed against the mounting surface and in direct contact with the mounting surface.

Aspect 8. The adhesive mounting article of any of aspect 7, wherein when the flexible adhesive tape structure is received in the recess of the rigid face plate structure, a gap is formed between a bottom edge of the flexible backing layer and a bottom portion of the apron.

Aspect 9. The adhesive mounting article of aspects 7 or 8, wherein the apron includes a compressible material.

Aspect 10. The adhesive mounting article of any of aspects 7-9, wherein the apron includes a rigid portion, the rigid portion is located at a bottom portion of the rigid faceplate structure and configured to be in direct contact with the mounting surface and act as a supporting member.

Aspect 11. The adhesive mounting article of any of aspects 1-10, wherein the rigid faceplate structure further includes a mounting member disposed on the second major surface of the rigid faceplate.

Aspect 12. The adhesive mounting article of aspect 11, wherein the mounting member includes a hook that is permanently attached to the rigid faceplate.

Aspect 13. The adhesive mounting article of any of aspects 1-12, wherein the rigid faceplate is made of polycarbonate (PC) or acrylonitrile butadiene styrene (ABS).

Aspect 14. The adhesive mounting article of any of aspects 1-13, wherein the separable connection formed between the first and second separable connecting members includes at least one of a hook-loop connection, a dual-lock connection, a micro-rail connection, and a magnetic connection.

Aspect 15. The adhesive mounting article of any of aspects 1-14, wherein the rigid faceplate structure further includes a rigid supporting member disposed on a lower portion of the first major surface thereof, and the rigid supporting member is positioned vertically lower than the flexible adhesive tape structure and configured to be in direct contact with the mounting surface when the rigid faceplate structure is connected, via the separable connection, to the flexible adhesive tape structure.

Aspect 16. An article support adapted for adhering to a substrate, comprising:
a flexible adhesive tape including a flexible backing layer, a peelable adhesive coated on a rear surface of the flexible backing layer, the flexible adhesive tape being capable of adhering to, via the peelable adhesive, the substrate and thereafter being manually removable from the substrate by peeling;
a rigid plate including a mounting member permanently attached to a front surface of the rigid plate; and
a separable connector including a first connector member disposed on a front surface of the flexible backing layer and a second connector member disposed on a rear surface of the rigid plate, the first and second connector components being engagable/disengagable with each other to connect/disconnect the rigid plate and/from the flexible adhesive tape.

Aspect 17. The article support of aspect 16, wherein the rigid plate further includes a recess to receive the flexible adhesive tape, and the rigid plate covers the flexible adhesive tape when the rigid plate is connected, via the separable connector, to the flexible adhesive tape.

Aspect 18. An article support adapted for adhering to a substrate, comprising:
a flexible adhesive tape having a first major surface and a second major surface opposite to the first major surface, the first major surface including a peel release adhesive capable of adhering to the substrate; and
a rigid plate having a first major surface and a second major surface opposite to the first major surface, the first major surface including a mounting member permanently attached thereon,
wherein the second major surface of the adhesive tape and the second major surface of the rigid plate are engagable with each other to detachably connect the rigid plate and the flexible adhesive tape.

Aspect 19. The article support of aspect 18, wherein the rigid plate further includes a supporting member disposed at a lower portion of the second major surface thereof, and the rigid supporting member is positioned vertically lower than the flexible adhesive tape and configured to be in direct contact with the substrate when the rigid plate is connected to the flexible adhesive tape.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. An adhesive mounting article, comprising:
a flexible, non-stretch release adhesive tape structure having a first major surface and a second major surface opposite to the first major surface, the flexible adhesive tape structure including a peelable adhesive layer disposed on the first major surface and a first separable connecting member disposed on the second major surface, the peelable adhesive layer being capable of adhering to a mounting surface and thereafter being manually removable from the mounting surface by peeling and comprising a non-stretch release adhesive; and
a rigid faceplate structure including a rigid faceplate having a first major surface and a second major surface opposite to the first major surface, and a second separable connecting member disposed on the first major surface of the rigid faceplate, the first and second separable connecting members being configured to engage with each other to form a separable connection to connect the flexible adhesive tape structure and the rigid faceplate structure.

2. The adhesive mounting article of claim 1, wherein the rigid faceplate structure covers the flexible adhesive tape structure to prevent the flexible adhesive tape structure from being manually removed from the mounting surface by peeling when the rigid faceplate structure is connected, via the separable connection, to the flexible adhesive tape structure.

3. The adhesive mounting article of claim 1, wherein the flexible adhesive tape structure further includes a flexible backing layer, and the peelable adhesive layer and the first separable connecting member are disposed on opposite surfaces of the flexible backing layer.

4. The adhesive mounting article of claim 3, wherein the flexible backing layer extends longitudinally beyond an edge of the peelable adhesive layer to form a tab portion.

5. The adhesive mounting article of claim 3, wherein the flexible backing layer includes a flexible polymeric foam layer.

6. The adhesive mounting article of claim 1, wherein the rigid faceplate defines a recess on the first major surface thereof, the second separable connecting member is disposed within the recess, and when the first and second separable connecting members are engaged with each other to form the separable connection, the flexible adhesive tape structure is received by the recess.

7. The adhesive mounting article of claim 1, wherein the rigid faceplate structure further includes an apron disposed around a periphery of the rigid faceplate to form a recess, and the apron is positioned such that when the rigid faceplate structure is connected, via the separable connection, to the flexible adhesive tape structure at least a portion of the apron is pressed against the mounting surface and in direct contact with the mounting surface.

8. The adhesive mounting article of claim 7, wherein when the flexible adhesive tape structure is received in the recess of the rigid face plate structure, a gap is formed between a bottom edge of the flexible backing layer and a bottom portion of the apron.

9. The adhesive mounting article of claim 7, wherein the apron includes a rigid portion and a compressible material distinct from the material of the rigid portion.

10. The adhesive mounting article of claim 7, wherein the apron includes a rigid portion, the rigid portion is located at a bottom portion of the rigid faceplate structure and configured to be in direct contact with the mounting surface and act as a supporting member.

11. The adhesive mounting article of claim 1, wherein the rigid faceplate structure further includes a mounting member disposed on the second major surface of the rigid faceplate.

12. The adhesive mounting article of claim 11, wherein the mounting member includes a hook that is permanently attached to the rigid faceplate.

13. The adhesive mounting article of claim 1, wherein the rigid faceplate is made of polycarbonate (PC) or acrylonitrile butadiene styrene (ABS).

14. The adhesive mounting article of claim 1, wherein the separable connection formed between the first and second separable connecting members includes at least one of a hook-loop connection, a dual-lock connection, a micro-rail connection, and a magnetic connection.

15. The adhesive mounting article of claim 1, wherein the rigid faceplate structure further includes a rigid supporting member disposed on a lower portion of the first major surface thereof, and the rigid supporting member is positioned vertically lower than the flexible adhesive tape structure and configured to be in direct contact with the mounting surface when the rigid faceplate structure is connected, via the separable connection, to the flexible adhesive tape structure.

16. An article support adapted for adhering to a substrate, comprising:
 a flexible, non-stretch release adhesive tape including a flexible backing layer, a peelable adhesive comprising a non-stretch release adhesive coated on a rear surface of the flexible backing layer, the flexible adhesive tape being capable of adhering to, via the peelable adhesive, the substrate and thereafter being manually removable from the substrate by peeling;
 a rigid plate including a mounting member permanently attached to a front surface of the rigid plate; and
 a separable connector including a first connector member disposed on a front surface of the flexible backing layer and a second connector member disposed on a rear surface of the rigid plate, the first and second connector components being engagable/disengagable with each other to connect/disconnect the rigid plate and/from the flexible adhesive tape,
 wherein the rigid faceplate defines a recess on a rear surface thereof, the second connector member is disposed within the recess, and when the first and second connector members are engaged with each other to form the separable connection, the flexible adhesive tape structure is received by the recess.

17. The article support of claim 16, wherein the rigid plate further includes a recess to receive the flexible adhesive tape, and the rigid plate covers the flexible adhesive tape when the rigid plate is connected, via the separable connector, to the flexible adhesive tape.

18. An article support adapted for adhering to a substrate, comprising:
 a flexible, non-stretch release adhesive tape having a first major surface and a second major surface opposite to the first major surface, the first major surface including a peel release adhesive capable of adhering to the substrate and the peel release adhesive comprising a non-stretch release adhesive; and
 a rigid plate having a first major surface and a second major surface opposite to the first major surface, the first major surface including a mounting member permanently attached thereon,
 wherein the second major surface of the adhesive tape and the second major surface of the rigid plate are engagable with each other to detachably connect the rigid plate and the flexible adhesive tape, and wherein the flexible adhesive tape is removable from the substrate by peeling a peel angle of at least 90 degrees.

19. The article support of claim 18, wherein the rigid plate further includes a supporting member disposed at a lower portion of the second major surface thereof, and the rigid supporting member is positioned vertically lower than the flexible adhesive tape and configured to be in direct contact with the substrate when the rigid plate is connected to the flexible adhesive tape.

20. The article support of claim 18, wherein the separable connection formed between the second major surfaces includes at least one of an intermeshing system, a mechanical interlocking connector system, and a releasable contact responsive fastener.

\* \* \* \* \*